United States Patent [19]

Kang

[11] Patent Number: 4,988,488

[45] Date of Patent: Jan. 29, 1991

[54] IRON ALUMINIDES AND NICKEL ALUMINIDES AS MATERIALS FOR CHEMICAL AIR SEPARATION

[75] Inventor: Doohee Kang, Macungie, Pa.

[73] Assignee: Air Products and Chemicals, Inc., Allentown, Pa.

[21] Appl. No.: 423,832

[22] Filed: Oct. 19, 1989

[51] Int. Cl.$^5$ .............................. C01B 13/02
[52] U.S. Cl. ................... 423/210.5; 420/77; 420/80; 420/81; 420/459; 420/460; 423/219; 423/579
[58] Field of Search ............ 423/210.5, 219, 579; 420/445, 77, 80, 81, 459, 460

[56] References Cited

U.S. PATENT DOCUMENTS

| | | | |
|---|---|---|---|
| 1,995,647 | 3/1935 | Pier et al. | 420/80 |
| 3,303,561 | 2/1967 | Cabane et al. | 420/81 |
| 3,329,498 | 7/1976 | Cavalier | 420/445 |
| 4,132,766 | 1/1979 | Erickson | 423/579 |
| 4,287,170 | 9/1981 | Erickson | 423/579 |
| 4,340,578 | 7/1982 | Erickson | 423/579 |
| 4,405,368 | 9/1983 | Ray et al. | 420/77 |
| 4,421,530 | 12/1983 | Dalton, Jr. et al. | 55/26 |
| 4,421,531 | 12/1983 | Dalton, Jr. et al. | 55/26 |
| 4,521,398 | 6/1985 | Erickson | 423/579 |
| 4,526,775 | 7/1985 | Cassano | 423/579 |
| 4,529,577 | 7/1985 | Chen et al. | 423/210.5 |
| 4,565,685 | 1/1986 | Cassano | 423/579 |
| 4,612,165 | 9/1986 | Liu et al. | 420/459 |
| 4,613,368 | 9/1986 | Chang et al. | 420/460 |
| 4,617,029 | 10/1986 | Pez et al. | 55/16 |
| 4,617,182 | 10/1986 | Brown et al. | 423/579 |
| 4,629,577 | 12/1986 | Liston | 252/32.7 |
| 4,708,860 | 11/1987 | Weimer | 423/579 |
| 4,710,247 | 12/1987 | Huang et al. | 420/460 |
| 4,711,761 | 12/1987 | Liu et al. | 420/459 |
| 4,722,828 | 2/1988 | Liu | 420/455 |
| 4,731,221 | 3/1988 | Liu | 420/445 |
| 4,746,502 | 5/1988 | Erickson | 423/579 |
| 4,800,070 | 1/1989 | Carlin et al. | 423/210.5 |

FOREIGN PATENT DOCUMENTS 1382026  1/1975  United Kingdom ............... 420/445

OTHER PUBLICATIONS

European Patent Application No. 0175898, published 4-2-86.
European Patent Application No. 0175899, published 4-2-86.
International Publication WO79/00343, published Jun. 14, 1979.

Primary Examiner—Wayne A. Langel
Attorney, Agent, or Firm—Geoffrey L. Chase; James C. Simmons; William F. Marsh

[57] ABSTRACT

The present invention is directed to a chemical air separation process using a molten salt solution of alkali metal nitrate and nitrite wherein the materials of construction of the containment for the process are chosen from intermetallic alloys of nickel and/or iron aluminide wherein the aluminum content is 28 atomic percent or greater to impart enhanced corrosion resistance.

8 Claims, No Drawings

IRON ALUMINIDES AND NICKEL ALUMINIDES AS MATERIALS FOR CHEMICAL AIR SEPARATION

TECHNICAL FIELD

This invention was made with Government support under Contract No. DE-FC07-87IDI2672 awarded by the U.S. Department of Energy. The government has certain rights in the invention.

The present invention is directed to the field of chemical air separation of oxygen from nitrogen using molten alkali metal salts. More specifically, the present invention is directed to improved corrosion resistant materials of construction for a process of chemical air separation of oxygen from nitrogen using alkali metal nitrate and nitrite salts at elevated temperature and pressure.

BACKGROUND OF PRIOR ART

The chemical separation of air into oxygen-enriched gas and nitrogen-enriched gas using molten alkali metal nitrate and nitrite salts is well known in the patent literature and is exemplified by U.S. Pat. No. 4,132,766 as well as 4,421,531, 4,421,530, 4,340,578, 4,287,170, 4,521,398, 4,526,775, 4,529,577, 4,565,685, 4,617,029, 4,800,070 4,617,182, 4,746,502, and 4,708,860, all of which patents are hereby incorporated herein by reference in their entirety.

Various nickel aluminum alloys are known including nickel aluminum alloys containing iron. These alloys have 25 molar percent or less aluminum content. For instances, U.S. Pat. No. 4,612,165 discloses $Ni_3Al$ alloys containing minor amounts of hafnium and zirconium and potentially 6 to 12% iron. U.S. Pat. No. 4,711,761 discloses alloys of $Ni_3Al$ with minor portions of boron and 6 to 16 weight percent iron. U.S. Pat. No. 4,722,828 discloses alloys of $Ni_3Al$ with effective amounts of Group 4B elements to increase high temperature strength, sufficient concentrations of iron or rare earth elements to increase hot fabricability and a sufficient concentration of boron to increase ductility. Iron can be present in the range of 14.5 to 17.5 weight percent. The alloys are recited to have oxidation resistance.

U.S. Pat. No. 4,731,221 discloses alloys with enhanced oxidation resistant properties in oxidizing environments comprising nickel aluminides in ratio of approximately 3 atoms nickel to 1 atom aluminum with an additive of chromium to enhance ductility at elevated temperatures in oxidizing environments. In one embodiment, aluminum is present in a concentration of from 17 to 20 atomic percent and iron is present in a concentration of from 9 to 16 atomic percent.

The various alloys disclosed in the prior art cited above all suffer from unacceptable corrosion rates in the environment of molten salt solutions of alkali metal nitrate and nitrites used for chemical air separation in the presence of various oxides, peroxides, and superoxides. An acceptable corrosion rate would be up to 10 mils (one mil=0.001 of inch) per year (MPY). The utilization of alloys set forth in the present invention successfully overcome this corrosion problem and meet or exceed the corrosion rate of 10 mils per year for chemical air separation in molten salt solutions of alkali metal nitrate and nitrites.

BRIEF SUMMARY OF THE INVENTION

The present invention is a process for separating oxygen from nitrogen in air by contacting air with a molten solution of an oxygen acceptor to selectively absorb oxygen to produce a nitrogen-enriched gas and separately releasing the absorbed oxygen to regenerate the molten solution and to produce an oxygen-enriched gas, the improvement comprising conducting the process in a containment of an intermetallic alloy of at least 28 mole percent aluminum and another metal selected from the group consisting of nickel, iron and mixtures thereof. Preferably the aluminum content of the intermetallic alloy is in the range of 28 to 50 atomic percent.

Preferably the intermetallic alloy contains effective quantities of boron, hafnium and/or zirconium to increase ductility and high temperature strength, respectively. Preferably the process is conducted at a temperature in the range of approximately 450° to 1,250° F.

Preferably the molten solution of an oxygen acceptor comprises approximately 50% sodium and 50% potassium nitrate and nitrite salts with 1% barium oxide and 0.4% sodium peroxide.

Preferably the intermetallic alloy is iron aluminide of at least 28 mole percent aluminum. Alternatively, the intermetallic alloy is nickel aluminide of at least 28 mole percent aluminum.

More specifically, the process of the present invention is a continuous process for producing oxygen from air by the repeated steps of contacting air with a molten solution of alkali metal nitrate and nitrites containing various oxides, peroxides, and superoxides, at a temperature in the range of 450° to 1.250° F. and a pressure in the range of 4 to 200 psia, to oxidize at least a portion of the nitrite to nitrate by absorbing oxygen from the air and resulting in an oxygen-depleted gas stream, desorbing the absorbed oxygen from the molten solution by pressure reduction and or temperature increase to reduce at least a portion of the nitrate to nitrite, recovering oxygen-enriched gas and recycling thus regenerated molten salt for further contact with air, the improvement comprising conducting the process in apparatus fabricated at least in part from a corrosion resistant intermetallic alloy selected from the group consisting of iron aluminide and nickel aluminide wherein the aluminum is present in the range of 28 to 50 atomic percent.

DETAILED DESCRIPTION OF THE INVENTION

The process of the present invention using improved materials of construction in the process containment or apparatus, such as; reaction vessels, conduits, pumps, heat exchange surfaces, absorbers and desorbers, as well as other attendant equipment, is used in conjunction with a chemical air separation method which involves the selective reaction and absorption of oxygen from air in a molten salt solution of an oxygen acceptor. The underlying absorption method of the present invention offers an alternative to traditional cryogenic air separation for the production of oxygen, oxygen-enriched gas, and nitrogen-enriched gas from an oxygen-containing feedgas stream, such as air. The reversible chemical reaction scheme of the underlying method in the present invention provides the potential for reduced energy requirements in performing the separation of air, particularly when used in conjunction with an oxygen-consuming high temperature attendant or parallel process.

The chemical absorptive separation of air will briefly be outlined below. The use of an oxygen acceptor such as Na, K, Ba, Ca, Cs, Rb, Mg, Sr and Re nitrate and nitrite combinations or oxides, peroxides and super oxides of these metals in molten liquid solution provides ease of process performance conducting continuous isolation of oxygen from an oxygen-containing feedgas, such as air. A preferred oxygen accepting molten salt solution would constitute a mixture of alkali metal nitrate and nitrite wherein the alkali metal cation is approximately 100 percent sodium and potentially a minor amount of potassium and lithium cation. Minor amounts of other alkali metal cations rubidium and cesium may also be present. There may also be minor amounts of cations present, particularly alkali earth cations such as barium, calcium, strontium and magnesium. Additionally, the oxygen acceptor molten salt solution can contain up to greater than 50 molar percent of alkali metal oxides, peroxides, and superoxides taken in combination, the concentration of which depends upon the reaction temperature. This amount of oxides can be formed and can be maintained in the molten liquid solution during operation of the process. Other oxygen acceptors known in the art include $BaO$, $MnO_3$, $CuCl_2$, $SrO$, $Hg$, Pr-Ce oxides, $Cr_2)_3$, $SrCrO_4$ and solutions containing fluomine, salcomine, hemoglobin and phosphinomanganese complexes.

In all chemical air separation processes such as those using the above described materials, the most fundamental characteristic to be considered is the equilibrium oxygen partial pressure. The essence of all processes in this field is to first contact air or an oxygen-containing gas stream with an oxygen acceptor, such as the molten salt solutions described above, having a partial pressure of oxygen lower than the partial pressure of oxygen in the absorption feed gas stream, such as air. This makes possible the desirable reaction between the oxygen acceptor and the free oxygen in the air or oxygen-containing feed stream. Reaction conditions, such as temperature, contact dynamics, residence time, and pressure must be such that the reaction between the free oxygen and oxygen acceptor will proceed at an acceptably rapid rate. No matter how rapid the rate, however, the reaction thermodynamically cannot proceed beyond the point at which the partial pressure of oxygen in the air or oxygen-containing feedstream equals the partial pressure of oxygen in the acceptor. If full equilibrium is obtained, the partial pressure of oxygen in the oxygen-depleted gas stream exhausting from the process will be equal to the partial pressure of oxygen in the acceptor. Thus, if the partial pressure of oxygen in the incoming air or oxygen-containing feedstream is only slightly above the partial pressure of oxygen in the acceptor, only a small portion of the oxygen in the air or the gas stream can react and can become bound to the oxygen acceptor. However, if the partial pressure of oxygen in the incoming air feedstream is substantially above the partial pressure of oxygen in the acceptor, most of the oxygen can react and become bound to the oxygen acceptor. The next step of all chemical separation processes after oxidizing the oxygen acceptor is to expose the oxidized oxygen acceptor to an atmosphere in which the existing partial pressure of oxygen is lower than the partial pressure of oxygen of the oxidized acceptor. This causes the acceptor to decompose and release the free oxygen since the escaping tendency of the oxygen from the acceptor is greater than the escaping tendency of the oxygen from the low oxygen partial pressure atmosphere. The atmosphere with the required low partial pressure for oxygen can be provided by drawing a vacuum, in which case, fairly pure oxygen is collected or it can be provided by sweeping the acceptor with the diluent gas such as nitrogen, air or steam in which case the evolved oxygen will have the corresponding impurities present. Similarly to the oxidation reaction, the decomposition reaction must be conducted under conditions such that its rate is acceptably rapid. Process economics dictate that both reactions achieve a near approach to equilibrium conditions. For the decomposition reaction, the partial pressure of oxygen in the product gas being collected from that reaction cannot exceed the partial pressure of oxygen of the acceptor undergoing decomposition.

The present invention directed to materials of construction having a low corrosion rate in the presence of alkali metal nitrate and nitrite constitutes an improvement in process procedures in the chemical separation schemes set forth in one or more of the processes described in U.S. Pat. Nos. 4,421,531, 4,421,530, 4,132,766, 4,340,578, 4,287,170, 4,521,398, 4,526,775, 4,629,577, 4,565,685, 4,617,029, 4,800,070, 4,617,182, 4,746502,and 4,708,860. In those patents, the thermodynamics of the oxygen acceptor separation process are set forth in detail, and several particular basic flow schemes for the recovery of oxygen from feed streams, such as air, are described in detail. Much of the principals of those patents are relevant to the present invention and therefore the descriptions of U.S. Pat. Nos. 4,421,531, 4,421,530 4,132,766, 4,340,578, 4,287,170, 4,521,398, 4,526,775, 4,629,577, 4,565,685, 4,617,029, 4,800,070, 4,617182, 4,746,502, and 4,708,860 are hereby incorporated by reference into the description of the present invention in their entirety.

The present invention will be described in greater detail with reference to the above process and the benefits of performing such a process and appropriate equipment and containment devices which create a system having acceptably low corrosion rates. In conducting a chemical air separation, as described above, the containment materials, which would most likely be metals rather than ceramic components, have been found to show unacceptable levels of corrosion and specifically oxidation due to the corrosive environment of the molten salts, the high temperatures of operation, and the pressures of operation. In addition, the presence of various oxides and the oxygen that ultimately is bound up during the oxygen separation procedure constitutes a deleterious environment for the maintenance of appropriate containment materials. Metals which have been found to provide unacceptable corrosion rates as materials of containment in potentially all areas of the chemical air separation process described above include stainless steel such as SS-316 (Fe-12-Ni-17Cr-2.5Mo), Inconel 600 (Ni-15.5Cr-8Fe), Incoloy 800 (Fe-32.5Ni-21Cr-0.4Al) and other alloys which will be set forth in the tables below. Containment metals of zirconium, especially pure zirconium, and hafnium have been found to provide appropriate corrosion resistance, but the economics of fabricating containment components from those metals is unfavorable due to their cost and lack of appropriate machining and fabricating properties.

It has been ascertained that, in order for a chemical air separation process using an oxygen acceptor such as alkali metal nitrates and nitrites to produce an oxygen product which is economically competitive with present air separation technology, it will be necessary to provide a material of construction for the containment of the process having a corrosion rate of 10 mils per year (MPY) or less for 20 years of plant life.

The present invention provides materials which have exceptional resistance to corrosion in molten salt solutions systems of the type used in chemical air separation processes, as identified above. The specific materials are alloys comprised of nickel and/or iron and aluminum with minute quantities of other elements such as boron, hafnium or zirconium in which the aluminum concentration is at least 28 atomic percent or more and preferably in the range of approximately 28 atomic percent to 50 atomic percent.

The acceptability of iron aluminides wherein the aluminum is at least 28 mole percent or greater in a molten salt solution of alkali metal nitrate and nitrite, such as would be used in the chemical air separation described above, is set forth in Table 1.

TABLE 1

Effect of Aluminum Content on Corrosion Rates of Iron-Aluminides (MPY) in the Presence of Various Catalyst Concentrations 50—50 Na—K Nitrate-nitrite at 1250° F. and 20 PSIG Oxygen Partial Pressure

| Aluminum Content, Mole % | Corrosion Reported in MPY | | | |
|---|---|---|---|---|
| | 1% BaO | 1% BaO + .2% Na2O2 | 1% Na2O2 | 0.2% Na2O2 |
| 26 | 35 | 39 | 83 | 49 |
| 28 | 3 | 4 | | |
| 30 | 3 | 3 | 50 | 6 |
| 34 | 2 | 3 | 48 | 2 |
| 35 | 1 | 1 | 18 | 1 |
| 40 | 1 | 1 | 49 | 1 |
| 45 | 0 | 1 | 15 | 1 |

It is readily apparent in looking at the results of Table 1 that increasing aluminum content in an iron aluminide from 28 percent up through at least 45 percent provides a decided corrosion rate improvement in a molten salt solution configured with various catalyst. Although when sodium peroxide is present at a 1 percent catalyst concentration all of the metals show unacceptably high corrosion rates, it can be appreciated that by tailoring the molten salt solution appropriately, acceptable corrosion rates with the iron aluminides of the present invention can be obtained.

Table 2 indicates that operation of the process within prescribed temperature limitations is also important in achieving desired low corrosion rates. Appropriate corrosion rates with iron aluminide are identified at 1250° F. while unacceptable corrosion rates are achieved at 1300° F., except for the highest aluminum concentration levels of the iron aluminide alloys.

TABLE 2

Effect of Aluminum Content on Corrosion Rates (MPY) of Iron-Aluminides at 1250 and 1300° F. 100% NaNO3 at 20 PSIA Oxygen Partial Pressure w/1% BaO

| Aluminum Content, Mole % | MPY at 1250° F. | MPY at 1300° F. |
|---|---|---|
| 26 | 5 | 235 |
| 28 | 4 | 49 |
| 30 | 4 | 29 |
| 34 | 2 | 18 |
| 35 | 5 | 16 |
| 40 | 2 | 11 |
| 45 | 2 | 9 |

Table 3, set forth below, discloses the corrosion rate of a nickel aluminide wherein aluminum constitutes 50% of the alloy on an atomic basis when subjected to a molten salt solution of nitrate and nitrite with the delineated cations, catalyst presence and temperature and pressure.

TABLE 3

| | Ni-50Al | | | |
|---|---|---|---|---|
| Cations (atomic %) | Catalyst (mole) | °F. | psia | Corrosion in MPY |
| 50Na/50K | 1% Na2O2 | 1250 | 15.0 | 18 |
| 100Na | 1% Na2O2 | 1250 | 20.0 | 4 |
| 100Na | 1% BaO | 1250 | 20.0 | 2 |
| 100Na | 1% BaO 0.2% Na2O2 | 1200 | 20.0 | 1 |
| 50Na/50K | 1% BaO | 1200 | 3.0 | 1 |

The corrosion rates of various nickel and aluminum containing alloys with lower atomic percentages of aluminum are set forth in Table 4 which indicates unacceptably high corrosion rates for such alloys as containment materials for the process of the present invention.

TABLE 4

Salt Mixture: (50Na/50K)/NO3/NO2) with 1 mole % Na2O2 at 1200° F. and 1 atm air (3 psia O2)

| | IC-50 (Ni—21.7Al) | | IC-218 (Ni—16.7Al—7.9Cr) | | IC-221 (Ni—16.7Al—BCr) | |
|---|---|---|---|---|---|---|
| Composition | Wt % | Atomic % | Wt % | Atomic % | Wt % | Atomic % |
| Ni | 88.08 | 77.8 | 82.88 | 74.8 | 81.98 | 74.2 |
| Al | 11.3 | 21.7 | 8.5 | 16.7 | 8.5 | 16.7 |
| Cr | — | — | 7.8 | 7.9 | 7.8 | 8.0 |
| Zr | 0.6 | 0.3 | 0.8 | 0.5 | 1.7 | 1.0 |
| B | 0.02 | 0.1 | 0.02 | 0.1 | 0.02 | 0.1 |
| Corrosion* Rate, MPY | 147 | | 163 | | 125 | |

*Represents multiple readings for each Corrosion Rate data point.

It is also interesting to note that the variation in nickel content of an alloy without aluminum does not enhance corrosion rates in the molten salts of the present invention as set forth in Table 5 below.

TABLE 5

Salt Mixture, (50Na/50K)/NO3/NO2) with 1 mole % Na2O2 at 1200° F. and 1 atm air

| Composition Wt % | Ni-200 | Ni-201 | Ni-270 | Ni |
|---|---|---|---|---|
| Ni | 99.0 | 99.0 | 99.97 | 99.9975 |
| C | 0.075 | 0.025 | 0.020 | 0.0073 |
| S | 0.0007 | 0.0013 | 0.0013 | 0.0019 |
| Corrosion Rate, MPY | 233 | 197 | 219 | 132 |

Various nickel aluminides are known in the prior art as set forth in various patents in the Background of the Prior Art section of the present application. However, these nickel aluminides are all based on $Ni_3Al$ where in nickel is present in a 3 to atomic ratio in comparison to aluminum and therefore the aluminum content is 25 atomic % or less. The distinguishing feature of the present materials used for materials of construction for containment of the process of the present invention is that the nickel aluminide is based upon NiAl wherein the aluminum is present in at least 28 atomic percent and preferably 28 to 50 atomic percent. Table 6, set forth below, identifies the considerable distinction between the materials of construction in the present invention and the nickel aluminides having 25% or less aluminum of the prior art.

TABLE 6

| Corrosion Rates of NiAl Vs. $Ni_3Al$ | | | | | | |
|---|---|---|---|---|---|---|
| Exp. # | 18I-1 | 18I-2 | 18I-3 | 18I-4 | 18I-5 | 18I-6 |
| Base Salt = $Na/K/NO_3/NO_2$ | | | | | | |
| Cation | | | | | | |
| Atomic % Na | 50 | 50 | 50 | 49.5 | 49.5 | 49.5 |
| Atomic % K | 50 | 50 | 50 | 49.5 | 49.5 | 49.5 |
| Initial Catalyst, Mole % | | | | | | |
| $Na_2O_2$ | 0.2 | 0.2 | 0.2 | 0.2 | 0.2 | 0.2 |
| BaO | 0 | 0 | 0 | 1 | 1 | 1 |
| Test Conditions | | | | | | |
| °F. | 1250 | 1250 | 1250 | 1250 | 1250 | 1250 |
| Gas | $O_2$ | $O_2$ | $O_2$ | $O_2$ | $O_2$ | $O_2$ |
| Pressure | Atm | Atm | Atm | Atm | Atm | Atm |
| Materials - Corrosion Rate (mils per year) | | | | | | |
| NiAl (50 atomic % Al) | 8 | 2 | 3 | 0.3 | 1 | 0.5 |
| $Ni_3Al$ (IC-50) (25 atomic % Al) | 37 | 34 | 47 | 49 | 40 | 26 |

As can be seen in Table 6, the corrosion rate for the prior art $Ni_3Al$ is considerably higher in the molten salt solutions of alkali metal nitrate and nitrite of the present invention over the corrosion rate of the identified preferred materials of construction of the present invention of NiAl having 28 mole percent or greater aluminum content. Using the criteria of 10 MPY it can be seen that even at various chemical air separation process conditions as set forth in Table 6. the nickel aluminide materials of the present invention easily meet the 10 MPY criteria while the nickel aluminide materials of the prior art fail to meet the corrosion rate by a considerable margin.

Based upon the plurality of data for iron aluminides presented above and the data produced for nickel aluminide, it is fully expected that nickel aluminide will exhibit the same corrosion rate performance of iron aluminide over the range of aluminum content of 28 to 50 atomic % aluminum, particularly in light of the fact that nickel is a transition metal in the same group of the Periodic Table of the Elements, namely Group 8.

All of the tests reported in Tables 1 through 6 above were conducted utilizing metal coupons in an artificially produced molten salt solution with the appropriate composition, temperature and pressure set forth at the various tables using a circulated solution environment. From this data, it is readily apparent that iron and/or nickel aluminide intermetallic alloys with aluminum contents higher than heretofore disclosed, particularly with aluminum contents at 28 mole percent or greater have a significantly and unexpectedly better performance in the environment of a chemical air separation using alkali metal nitrate and nitrites than would be expected from the known corrosion resistant nickel aluminides of $Ni_3Al$, wherein nickel is present in a 3 to 1 ratio compared to aluminum on an atomic basis and thus the aluminum has no higher concentration level than 25 percent. The significant lowering of corrosion rates under the defined circumstances demonstrates effectively that operation of a chemical air separation process using an oxygen acceptor with a containment fabricated with materials of construction of nickel or iron aluminides having 28 mole percent or greater aluminum provides a break through in the viability of such a chemical air separation process.

These intermetallic alloys of nickel and or iron aluminides of 28 mole percent or greater aluminum can be utilized to fabricate reaction vessels, conduits, impeller blades, pump housings, valves, heat exchangers, absorption columns. desorption vessels and other equipment necessary to the performance of chemical air separations using various oxygen acceptors, and such fabrications can be formulated using the nickel or iron aluminides as intermetallic alloys of solid construction or potentially as liners in more traditionally selected materials of construction. It is also possible to contemplate that the nickel and/or iron aluminides of the present invention containing 28 mole percent or more aluminum could be utilized in only selected portions of the containment apparatus described above wherein the conditions of temperature, pressure, and oxygen dictate more corrosion resistance due to higher elevations of corrosion imparted to those structures in severe service. For instance, higher oxygen levels would be contemplated in absorption contact equipment. Higher temperatures may be experienced in desorption equipment or heat exchangers. High flow rates of molten salt solutions might be expected in the vicinity of pumping or impeller equipment and small diameter conduits. Therefore, it is entirely possible within the context of the present invention to use either solid, clad or composite construction with the intermetallic alloys of the present invention or selectively use such intermetallic alloys in portions of the process containment rather than all of the containment.

The present invention has been set forth with regard to a preferred embodiment, however the full scope of the invention should be ascertained from the claims which follow.

I claim:

1. In a process for separating oxygen from nitrogen in air by contacting air with a molten solution of alkali metal nitrates and nitrites to selectively absorb oxygen to produce a nitrogen-enriched gas and separately releasing the absorbed oxygen to regenerate the molten solution and to produce an oxygen-enriched gas the improvement comprising conducting the process in containment of an intermetallic alloy of at least 28 atomic percent aluminum and another metal selected from the group consisting of nickel, iron and mixtures thereof wherein the intermetallic alloy contains an effective quantity of boron up to approximately 0.1 atomic percent to increase ductility of the alloy.

2. The process of claim 1 wherein the aluminum content of the alloy is in the range of 28 to 50 atomic percent.

3. The process of claim 1 wherein the process is conducted at a temperature up to 1250 °F.

4. The process of claim 1 wherein the molten solution comprises approximately 50% sodium and 50% potassium nitrate and nitrite salts with 1% barium oxide and 0.4% sodium peroxide.

5. The process of claim 1 wherein the alkali metal is 100% sodium.

6. The process of claim 1 wherein the intermetallic alloy is nickel aluminide of at least 28 atomic percent aluminum.

7. The process of claim 1 wherein the intermetallic alloy is iron aluminide of at least 28 atomic percent aluminum.

8. In a continuous process for producing oxygen from air by the repeated steps of contacting air with a molten solution of alkali metal nitrates and nitrites containing various oxides, peroxides, and superoxides at a temperature in the range of 450° to 1250 °F. and a pressure in the range of 4 to 200 psia to oxidize at least a portion of the nitrite to nitrate, oxides to peroxides and peroxides to superoxides by absorbing oxygen from the air and resulting in an oxygen-depleted gas stream, desorbing the absorbed oxygen from the molten solution by pressure reduction and/or temperature increase to reduce at least a portion of the nitrate to nitrite, superoxides to peroxides and peroxides to oxides, recovering oxygen-enriched gas and recycling the thus generated molten salt for further contact with air, the improvement comprising conducting the process in apparatus fabricated at least in part by a corrosion resistant intermetallic alloy selected from the group consisting of iron aluminide and nickel aluminide wherein the aluminum is present in the range of 28 to 50 atomic percent wherein the intermetallic alloy contains an effective quantity of boron up to approximately 0.1 atomic percent to increase ductility of the alloy.

* * * * *